United States Patent
Barthel et al.

(10) Patent No.: US 6,934,882 B2
(45) Date of Patent: Aug. 23, 2005

(54) METHOD AND DEVICE TO TRANSMIT DATA

(75) Inventors: Herbert Barthel, Herzogenaurach (DE); Karl-Theo Kremer, Adelsdorf (DE); Juergen Lechtermann, Münster (DE); Rudolf Stromberger, Thalmässing (DE); Karl Weber, Altdorf (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/467,409

(22) PCT Filed: Jan. 28, 2002

(86) PCT No.: PCT/DE02/00294

§ 371 (c)(1),
(2), (4) Date: Jan. 15, 2004

(87) PCT Pub. No.: WO02/063472

PCT Pub. Date: Aug. 15, 2002

(65) Prior Publication Data

US 2004/0153705 A1 Aug. 5, 2004

(30) Foreign Application Priority Data

Feb. 8, 2001 (DE) .......................... 101 05 707

(51) Int. Cl.⁷ ............................................. G06F 11/00
(52) U.S. Cl. ........................................ 714/18; 370/225
(58) Field of Search .................... 714/18, 4, 15, 714/39, 43, 47, 20, 21, 23, 25, 11, 12, 13; 370/225, 220, 228, 217; 709/201, 202, 223, 224

(56) References Cited

U.S. PATENT DOCUMENTS

| | | | |
|---|---|---|---|
| 4,974,150 A | * 11/1990 | Long et al. | ...................... 714/1 |
| 5,640,514 A | * 6/1997 | Barthel et al. | ............... 709/248 |
| 5,802,153 A | * 9/1998 | Sridhar et al. | ............... 375/220 |
| 6,501,996 B1 | * 12/2002 | Bieber | ......................... 700/19 |
| 6,680,915 B1 | * 1/2004 | Park et al. | ................... 370/254 |
| 6,701,377 B2 | * 3/2004 | Burmann et al. | ........... 709/249 |
| 2002/0042845 A1 | * 4/2002 | Burmann et al. | ........... 709/249 |

FOREIGN PATENT DOCUMENTS

WO      WO 90/09633      8/1990

* cited by examiner

*Primary Examiner*—Nadeem Iqbal
(74) *Attorney, Agent, or Firm*—Staas & Halsey LLP

(57) ABSTRACT

A method of transmitting data in a redundant automation system, has a plurality of data transmission units and a plurality of data processing units. To possibly transmit in an especially efficient manner with the hardware resources available, a data flow characteristic of the data transmission is continuously monitored on the respective data transmission units, and depending on the data flow, data transmission is switched between the various operating modes in such a manner that an operating mode is adjusted when a synchronized data flow is detected on at least two data transmission units, the operating mode having a higher availability vis-`a-vis the operating mode with a defective or one-way data flow on one of the data transmission units.

16 Claims, 1 Drawing Sheet

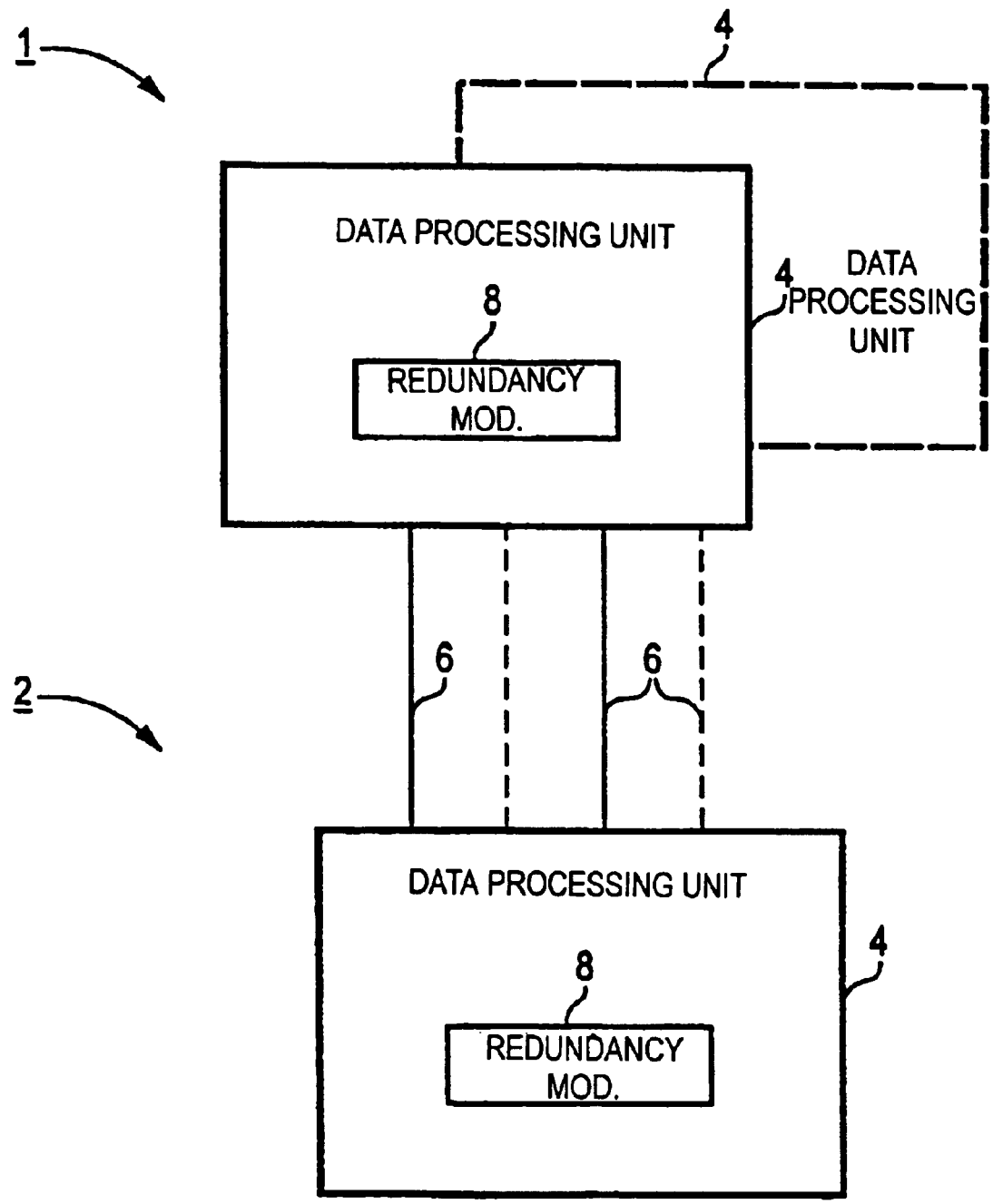

METHOD AND DEVICE TO TRANSMIT DATA

CROSS REFERENCE TO RELATED APPLICATIONS

This application is based on and hereby claims priority to PCT Application No. PCT/DE02/00294 filed on 28 Jan. 2002 and German Application No. 101 05 707.5 filed on 8 Feb. 2001, the contents of which are hereby incorporated by reference.

BACKGROUND OF THE INVENTION

An aspect of the invention relates to a method and a device to transmit data, for example, in a redundant computer system, in particular, in a high-availability system.

Usually, redundant concepts of automation systems or computer systems are distinguished according to media redundancy or system redundancy in terms of their availability and apportionment of redundant nodes. Media redundancy is understood as the redundant implementation of transmission units in order to increase the availability of the transmission units between two communicating data processing units. Media redundancy, in which one redundant node is provided for the medium and another redundant node for the transmitting station in each case, in a manner of comparatively tight redundant nodes, is used particularly in reliability-related automation systems or control systems of equipment where a failure of the data communication can lead to critical consequences in the equipment. Media-redundant systems are insensitive to effects on systems, which are connected to one another. One disadvantage of these media-redundant systems is that it is not possible to perform diagnostics with respect to a fault that may occur on the individual systems which are connected to one another, and even when it is possible to perform such diagnostics, it is possible only to a very limited degree. Accordingly, a system failure leads to a considerable reduction in the availability of the system and leads to considerable increase in the reaction times of the system.

In contrast, in the case of system redundancy in which only a single redundant node is provided to an entire system in a manner of comparatively wide redundant nodes, the availability of the entire computer system can be increased by making the reliability-related data processing units and other components, such as, decentralized controllers, printers, etc. redundant. Usually, the central control and safety-related input and output modules, in particular, are made redundant here. By such redundancy, which relates largely to the entire system, particularly high availability is provided, making it possible to provide targeted diagnostics for individual faults.

For media-redundant systems, usually so-called control gear is provided, which connect two-channel or multiply redundant data transmission from a single-channel control or data processing unit. Switching over or combining media redundancy and system redundancy is currently not possible.

SUMMARY OF THE INVENTION

Accordingly, an aspect of the present invention is directed to a method and a device to transmit data between data processing units, which communicate with one another, in a networked system in which-the highest possible degree of utilization of the given communications resources is made possible.

An aspect of the invention is achieved by providing a method of transmitting data in a redundant automation system comprising, a plurality of data transmission units and a plurality of data processing units, where a data flow that characterizes the data transmission is continuously monitored at the respective data transmission units and, as a function of the data flow, switching over is performed between different operating modes in such a way that when a synchronized data flow is present on at least two data transmission units, an operating mode is set which has a higher availability in comparison with an operating mode when there is a faulty or one-way data flow on one of the data transmission units.

A combination or switch-over between various availability levels of the redundant data transmission units, and thus of the redundant automation system, is provided by such a setting of the operating mode which takes into account the respective data flow on the particular data transmission units as well as the redundancies of the data transmission units which are available via hardware.

The subsequent data flow is expediently implemented as a function of the operating mode, which is set via one of the data transmission unit or via the plurality of data transmission units. This permits a transmission of data, which is both particularly fault-free and has high availability. In a high-availability data transmission, for example, a. redundant data transmission that is largely simultaneously transmitted via a plurality of data transmission units, the particular data transmission units are synchronized. The operating mode, which characterizes the high-availability data transmission, is referred to as media-redundant operating mode hereinafter.

In order to avoid feedback on data processing units, which are subject to faults, a predefined operating mode is preferably set as a function of the state of one of the data processing units. This permits non-interaction exchange of data via the data transmission unit.

To achieve a particularly fault-free exchange of data, one of the data transmission units is defined and set as a priority channel, and another data transmission unit is defined and set as a backup channel as a function of the operating mode which is set. For example, when there is an unequal reception of data via a plurality of data transmission units, the data transmission unit with the fault-free data flow is defined as the priority channel, and the data transmission unit with a data flow which is subject to fault is defined as the backup channel. Alternatively, the data transmission unit via which process-related and/or security-related data is transmitted is defined as the priority channel. In contrast, the data transmission unit via which diagnostics-related and/or management-related data is transmitted is defined as the backup channel. This operating mode in which the data transmission units are configured for different data flows is referred to as system-redundant operating mode hereafter.

In a data transmission which ensures a high reliability standard and in which the same data is exchanged in parallel via a plurality of data transmission units, the operating mode with high availability in which the data flow via all the respective data transmission units is continuously monitored, is expediently set. This ensures that a failure of an individual data transmission channel is detected as quickly as possible. Such a line diagnostics function permits preventative detection and maintenance of the channels. In particular, in case of a reception, which is subject to faults or one-way or single-channel reception, it is possible to switch over directly to the system-redundant operating mode.

Another aspect of the present invention is achieved via a device that transmits data in a redundant automation system, comprising a plurality of data processing units which are connected to one another via a plurality of data transmission units, at least one data processing unit comprising a redundancy module to monitor a data flow which characterizes the data transmission, one of a plurality of operating modes being capable of being set as a function of the data flow via the redundancy module in such a way that when a synchronized data flow is present on at least two data transmission units, it is possible to set an operating mode which has a higher availability in comparison with an operating mode when there is a faulty or one-way data now on one of the data transmission units. The redundancy module is used to automatically control switching over from one operating mode into another operating mode utilizing the existing data transmission modes in terms of hardware and/or software. Accordingly, a plurality of data transmission units are provided, and upon identifying a fault-free data transmission following a diagnostics, the system is switched over via the redundancy module into the media-redundant operating mode, an operating mode which has the highest possible availability and in which the same data is transmitted in parallel, approximately simultaneously, and thus redundantly, via a plurality of data transmission units. For this purpose, the data transmission units are synchronized.

The advantages achieved with the invention are, in particular, the fact that various operating modes which are graduated in terms of availability or redundancy can be set automatically as a function of the quality of the data flow on the data transmission units and as a function of the number, the type and the function of the data transmission units and/or the data processing units. Accordingly, optimum adaptation is assured in the superordinate system irrespective of the quality of the data flow. Rapid diagnostics and data transmission, which is optimized in terms of the current hardware resources and/or the current communications resources are thus made possible by virtue of the continuous monitoring.

BRIEF DESCRIPTION OF THE DRAWINGS

These and other objects and advantages of the present invention will become more apparent and more readily appreciated from the following description of the preferred embodiments, taken in conjunction with the accompanying drawing, which shows a device to transmit data in a redundant automation system.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The drawing shows a device to transmit data in a redundant automation system 2. The automation system 2 is, for example, a stored program controller or a networked computer system. The automation system 2 comprises a plurality of data processing units 4, which are connected to one another via a plurality of data transmission units 6. Depending on the type and embodiment of the automation system 2, the data processing units 4 and/or the data transmission units 6 are embodied to be simple, simply redundant, and/or multiply redundant. The figure illustrates one of the two data transmission units 4 with simple redundancy. The other data processing unit 4 (shown on the lower portion of the figure) is of simple design. The two data processing units 4 are connected to one another via two data transmission unit 6, which are of redundant design.

Each of the data processing units 4 have a redundancy module 8 to monitor a data now, which characterizes the data transmission. One of a plurality of operating modes is set by the redundancy module 8 as a function of the determined data flow when a synchronized data flow is present on the two data transmission units 6, making it possible to set an operating mode which has a higher availability in comparison with an operating mode with a fault-free data flow on one of the data transmission units 6. This highly available operating mode with synchronized data flow is also referred to as media-redundant operating mode.

According to the basic setting of the reception-end redundancy module 8, the latter waits for data from both transmission units 6. Depending on the type of data flow, a respective operating mode is set. In the event that different data is being received by the two data transmission units 6 or faulty data is being received from one of the two data transmission units 6, one of the data transmission units 6 is set as the priority channel. This operating mode is referred to as system-redundant operating mode.

Here, the priority channel is selected via the redundancy module 8 with reference to the preferred data transmission unit 6, which is predefined for the respective data processing unit 4. The other data processing unit 6 is defined as the backup channel.

After the data has been received, by referring to a fault statistic for the respective data transmission unit 6, the redundancy module 8 is used to define and set as the priority channel the data transmission unit 6 which had the fewest faults during the previous data transmission. The data transmission unit 6 via which the data flow is being executed is indicated to the respective data processing unit 4. Here, the application-specific and/or function-specific data traffic is carried out in the system-redundant operating mode by the data transmission unit 6, which is defined as the priority channel. The transmission unit 6, which is set as the backup channel is used only for the information-related and/or management-related data traffic.

In the event that the data is the same on both data transmission units 6, the two data transmission units 6 are synchronized when the data is received in the basic setting of the redundancy module 8. The synchronization corresponds approximately to a time range (=delay), which is the maximum permitted between the two data transmission units 6 for the redundant transmission of the same data. If this is not implemented within the time range (also referred to as synchronization window), one data transmission unit 6 is defined and set as the priority channel by the redundancy module 8 by referring to the quality and function of the respective data transmission unit 6.

When synchronization is successful, the system is switched over into the media-redundant operating mode by the redundancy module 8. The subsequent data flow via the data transmission unit 6 is continuously monitored in the media-redundant operating mode where the data items received from the two data transmission units 6 are compared with one another. Furthermore, the individual data is checked for faults and only fault-free data or telegrams are processed by the respective data processing unit 4. Upon finding similarity between the data items, the data transmission units 6 are switched to the active setting and the media-redundant operating mode is also switched. Upon finding no similarity between the data items without faults, for example, if a number of n asymmetrical data items or telegrams are received within a time range or interval, the media-redundant operating mode is automatically switched off. Depending on the number of available data transmission units 6, the system is switched over into an operating mode which has a lower availability in comparison with the media-redundant operating mode, for example, the system is switched into the system-redundant operating mode with a data transmission via a single priority channel or a plurality of priority channels.

Depending on the type and embodiment of the automation system 2, a statistics counter to sense the number of faulty telegrams or faulty data transmissions is provided for each data transmission unit 6 by the redundancy module 8. Given automation systems 2 with particularly high reliability standards, for example, controllers for power stations or chemical systems, each data transmission unit 6 is sampled 8 times, correspondingly evaluated and diagnosed in order to increase the reliability. By referring to the faults statistic, it is also easily possible to define one of the data transmission units 6 as the priority channel for the transmission of data. Faulty data flows can be detected within efficient time by an additional diagnostic function using the redundancy module 8 so that preventative maintenance is made possible.

The invention has been described in detail with particular reference to preferred embodiments thereof and examples, but it will be understood that variations and modifications can be effected within the spirit and scope of the invention.

What is claimed is:

1. A method of transmitting data in a redundant automation system having a plurality of data transmission units connecting a plurality of data processing units, comprising:
   continuously monitoring a data flow, which characterizes data transmission, on the data transmission units; and
   switching between different operating modes as a function of the data flow such that:
      when a synchronized data flow is present on at least two data transmission units, a second operating mode is activated, which has a higher availability of data transmission in comparison with first operating mode; and
      when there is an unequal reception of data via plurality of data transmission units, the first operating mode is set in which the data transmission units are configured for different data flows.

2. The method as claimed in claim 1, wherein a subsequent data flow between at least two data transmission units is implemented via one of the data transmission units or via the plurality of data transmission units as a function of the operating mode which is set.

3. The method as claimed in claim 1, wherein a predefined operating mode is set as a function of the state of one of the data processing units to allow non-interaction exchange of data via the data transmission units.

4. The method as claimed in claim 1, wherein as a function of the operating mode, one of the data transmission units is defined as a priority channel, and another data transmission unit is defined as a backup channel to be used for a predefined data traffic.

5. The method as claimed in claim 1, wherein the data flow via all the respective data transmission units is continuously monitored in the operating mode with high availability.

6. The method as claimed in claim 2, wherein a predefined operating mode is set as a function of the state of one of the data processing units to allow non-interaction exchange of data via the data transmission units.

7. The method as claimed in claim 6, wherein as a function of the operating mode, one of the data transmission units is defined as a priority channel, and another data transmission unit is defined as a backup channel to be used for a predefined data traffic.

8. The method as claimed in claim 7, wherein the data flow via all the respective data transmission units is continuously monitored in the operating mode with high availability.

9. A device to transmit data in a redundant automation system, comprising:
   a plurality of data processing units;
   a plurality of data transmission units connecting the plurality of data processing units;
   a redundancy module provided to at least one data processing unit to monitor a data flow which characterizes the data transmission; and
   a plurality of operating modes with at least one of the plurality of operating modes being capable of being set as a function of a data flow monitored via the redundancy module such that:
      when a synchronized data flow is present between at least two data transmission units, a second set operating mode is activated, which has a higher availability of data transmission in comparison with a first operating mode, and
      when there is an unequal reception of data via a plurality of data transmission units, the first operating mode is set in which the data transmission units are configured for different data flows.

10. A method of transmitting data in a redundant automation system having a plurality of data transmission units connecting a plurality of data processing units, comprising:
   continuously monitoring data flowing through at least two transmission units;
   if the same data is flowing through the transmission units, then synchronizing the data flow;
   if the data flow has been synchronized, switching to a media redundant operating mode; and
   if there is an unequal reception of data via the transmission units, switching to a system redundant operating mode in which the transmission units are configured for different data flow, the media redundant operating mode having a higher availability of data transmission in comparison with the system redundant operating mode.

11. The method as claimed in claim 10, further comprising:
   switching out of the efficient operating mode if faults are detected in the data or if the data flow is not synchronized.

12. The method as claimed in claim 10, wherein if different data is flowing through the transmission units or if faulty data is flowing through one or more transmission unit, one of the transmission units is set as a priority channel in a system redundant operating mode.

13. The method as claimed in claim 10, wherein the efficient operating mode is a media-redundant mode.

14. The method as claimed in claim 10, wherein switching to an efficient operating mode occurs only if the data flowing through the transmission units is error free.

15. The method as claimed in claim 12, wherein
   one of the transmission units transmits fault free data and another of the transmission units transmits faulty data,
   the transmission unit that transmits fault free data is set as the priority channel, and
   the transmission unit that transmits faulty data flow is set as a backup channel.

16. The method as claimed in claim 12, wherein
   one of the transmission units transmits process-related and/or security-related data and another of the transmission units transmits diagnostic-related and/or management-related data,
   the transmission unit which transmits process-related and/or security-related data is set as the priority channel, and
   the transmission unit which transmits diagnostic-related and/or management-related data is set as a backup channel.

* * * * *